(12) United States Patent
Larsson et al.

(10) Patent No.: US 8,599,952 B2
(45) Date of Patent: Dec. 3, 2013

(54) MU-COMP CHANNEL STATE NORMALIZATION MEASURE QUANTIZATION AND TRANSMISSION

(75) Inventors: Peter Larsson, Solna (SE); Jiansong Gan, Beijing (CN); Qingyu Miao, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 242 days.

(21) Appl. No.: 13/120,010

(22) PCT Filed: Sep. 24, 2008

(86) PCT No.: PCT/SE2008/051071
§ 371 (c)(1),
(2), (4) Date: Jul. 21, 2011

(87) PCT Pub. No.: WO2010/036159
PCT Pub. Date: Apr. 1, 2010

(65) Prior Publication Data
US 2011/0268208 A1  Nov. 3, 2011

(51) Int. Cl.
*H04B 7/02* (2006.01)
(52) U.S. Cl.
USPC ........... 375/267; 375/240; 375/340; 370/208; 370/329
(58) Field of Classification Search
USPC ................ 375/267, 240.22; 370/208, 329
See application file for complete search history.

(56) References Cited

U.S. PATENT DOCUMENTS

| | | | |
|---|---|---|---|
| 6,128,592 A * | 10/2000 | Miyazaki et al. | 704/224 |
| 2007/0153731 A1* | 7/2007 | Fine | 370/329 |
| 2009/0279419 A1* | 11/2009 | To et al. | 370/208 |
| 2013/0114733 A1* | 5/2013 | Fukui et al. | 375/240.22 |

FOREIGN PATENT DOCUMENTS

JP    2001-102976 A    4/2001

OTHER PUBLICATIONS

Japanese Office Action, mailed Feb. 22, 2013, in connection with counterpart Japanese Patent Application No. 2011-527767.
Translation of Japanese Office Action, mailed Feb. 22, 2013, in connection with counterpart Japanese Patent Application No. 2011-527767.
PCT International Search Report, mailed Jun. 16, 2009, in connection with International Application No. PCT/SE2008/051071.
Foschini, G. et al. "The Value of Coherent Base Station Coordination" 2005 Conference on Information Sciences & Systems, The Johns Hopkins University, Mar. 16-18, 2005.

(Continued)

*Primary Examiner* — Eva Puente
(74) *Attorney, Agent, or Firm* — Potomac Patent Group PLLC

(57) ABSTRACT

Uplink overhead is significantly reduced in a MU-COMP wireless communication network by exploiting the dissimilarity of received signal strength in signals transmitted by geographically distributed transmit antennas, as seen by receiving UEs. Each UE calculates a quantized normalization measure of channel elements for a channel weakly received from a first transmitter to that for a channel strongly received from a second transmitter. The quantized normalization measure may be modeled as a ratio of complex Gaussian variables, and quantized in phase and amplitude by making simplifying assumptions. The ratios are quantized, and transmitted to the network using far fewer bits than would be required to transmit the full channel state information. The network uses the quantized normalization measures to set the transmitter weights.

41 Claims, 5 Drawing Sheets

(56) References Cited

OTHER PUBLICATIONS

Ericsson: "LTE-Advanced—Coordinated Multipoint transmission/reception" 3GPP Draft; R1-083069, {COMP}, 3rd Generation Partnership Project, Mobile Competence Centre; 650, Route Des Lucioles; F-06921 Sophia-Antipolis Cedex; France, No. Jeju; Aug. 18, 2008, XP050316512.

Motorola: "LTE—A Multiple Point Coordination and Its Classification" 3GPP Draft; R1-083229, 3rd Generation Partnership Project, Mobile Competence Centre; 650, Route Des Lucioles; F-06921 Sophia-Antipolis Cedex; France, No. Jeju; Aug. 18, 2008, XP050316643.

3GPP: "3rd Generation Partnership Project; Technical Specification Group Radio Access Network; Further Advancements for E-UTRA Physical Layer Aspcts (Release X)" 3GPP Draft; TR 36.814_001, Mobile Competence Centre; 650, Route Des Lucioles; F-06921 Sophia-Antipolis Cedex; France, No. Prague, Czech Republic; Sep. 1, 2008, XP050317364.

ETRI: "Coordinated multi-cell transmission for LTE-Advanced downlink" 3GPP Draft; R1-082896 Multi-Cell MIMO, 3GPP, Mobile Competence Centre; 650, Route Des Lucioles; F-06921 Sophia-Antipolis Cedex; France, No. Jeju; Aug. 18, 2008, XP050316374.

Saleh, A.A.M. et al. Distributed antennas for indoor radio communications: IEEE Transactions on Communications, vol. 35, No. 12, pp. 1245-1251, 1987.

Gan, J. et al. "On sum rate and power consumption of multi-User distributed antenna system with circular antenna layout" EURASIP Journal on Wireless Communications and Networking, vol. 2007, Article ID 89780.

Max, J. "Quantizing for minimum distortion" IRE Transactions on Information Theory, vol. IT-6, No. 1, pp. 7-12, Mar. 1960.

\* cited by examiner

MU-COMP CHANNEL STATE NORMALIZATION MEASURE QUANTIZATION AND TRANSMISSION

FIELD OF THE INVENTION

The present invention relates generally to wireless communication networks, and in particular to a method of downlink channel state quantization and feedback by User Equipment (UE) in a Multi-User Coordinated Multipoint Transmission/Reception (MU-COMP) network.

BACKGROUND

A predecessor to Coordinated Multipoint Transmission/Reception (COMP), then denoted Distributed Antenna System (DAS), was originally introduced for coverage improvement in indoor wireless communications, as described by A. A. M. Saleh, A. J. Rustako Jr., and R. S. Roman, in a paper titled "Distributed antennas for indoor radio communications," published in the IEEE Transactions on Communications, vol. 35, no. 12, pp. 1245-1251, 1987. Their approach was directed towards transmission to a single user through a discrete implementation of a leaky feeder. The notion of COMP in contrast enables multiple data streams to be transmitted over an interconnected network of radioheads (or basestations) where the different signals representative of the multiple data streams may be controlled by weightings and distributed to the different radio heads. The idea of COMP may be used in downlink as well as uplink. In this invention we are concerned with downlink only. Recent studies indicate that COMP can provide not only coverage improvement but also capacity enhancement, as described by J. Gan et al., in a paper titled "On sum rate and power consumption of multi-User distributed antenna system with circular antenna layout," published in the EURASIP Journal on Wireless Communications and Networking, vol. 2007, Article ID 89780.

Techniques exploring the advantages of COMP can be classified into two categories: Single-User COMP (SU-COMP) and Multi-User COMP (MU-COMP). SU-COMP techniques attempt to improve the link quality for a single user by means of spatial multiplexing, or spatial diversity. However, SU-COMP techniques can not manage the mutual interference among users. Accordingly, Radio Resource Management (RRM) schemes are needed for geographically separated users that are using the same time/frequency resources. The reuse distance restricts the capacity increase of SU-COMP.

MU-COMP techniques jointly process signals to/from multiple users and attempt to improve the overall system performance. MU-COMP is quite similar to Multi-User Multiple-Input Multiple-Output (MU-MIMO) systems. Accordingly, techniques developed for MU-MIMO system, such as Zero-Forcing (ZF) beamforming and Dirty Paper Coding (DPC), can be directly applied to MU-COMP. Some of these techniques are described by G. J. Foschini et al., in a paper titled "The value of coherent base station coordination," published in the Proceedings of the 39th Annual Conference on Information Sciences and Systems (CISS '05), March 2005.

MU-COMP techniques can achieve the capacity limit provided by a COMP, as there is no need to separate users in time/frequency to avoid mutual interference, as in SU-COMP. However, for the downlink transmission, the transmitter needs to know all channel state information (CSI), which is impractical to implement. For MU-COMP, the direct application of traditional MU-MIMO techniques has two main drawbacks.

First, all channel elements are fed back, i.e. transmitted in uplink from the UE. This generates excessive uplink overhead and reduces the available resources for other desired uplink traffic. One example method of MU-COMP for downlink where the full channel knowledge is available (such as via feedback) at the transmitter is in zero forcing (ZF) beamforming, with the beamweight matrix $W=H^H(HH^H)^{-1}$. In this case the received signal can be expressed as $$y = H(H^H(HH^H)^{-1})x + n = x + n \qquad (1)$$

As equation (1) indicates, ZF beamforming not only eliminates the interferences, but also normalizes the channel response of the desired signal to be 1. Since the UE can adjust the phase of the received signal before detection, such transmitter-side normalization is not necessary. Further, the amplitude normalization to one for every user is not always desired since different link qualities and rates may be desired. Hence, the transmit power may also be set individually for each, after ZF, interference free link.

Second, the characteristics of MU-COMP channel are not fully explored. More specifically, for MU-MIMO, the channel between the transmitter and the receiver can be modeled using Independent and Identically Distributed (IID) random variables. However, for MU-COMP, since the antennas are geographically distributed, the channel elements between each transmitter and a receiver are not identically distributed. In most cases, the channel response of an undesired signal is much weaker than that of the desired signal.

SUMMARY

According to one or more embodiments of the present invention, uplink overhead is significantly reduced in a MU-COMP wireless communication network by exploiting the dissimilarity of received signal strength in signals transmitted by geographically distributed transmit antennas, as seen by receiving UEs. Each UE calculates a quantized normalization measure of channel elements for a channel weakly received from a first transmitter compared to that for a channel strongly received from a second transmitter. The normalization measure may be modeled as a ratio of complex Gaussian variables, and quantized in phase and amplitude by making simplifying assumptions. The ratios are quantized, and transmitted to the network using far fewer bits than would be required to transmit the full channel state information. The network uses the quantized normalization measures to set the transmitter weights.

DETAILED DESCRIPTION

Figure 1:
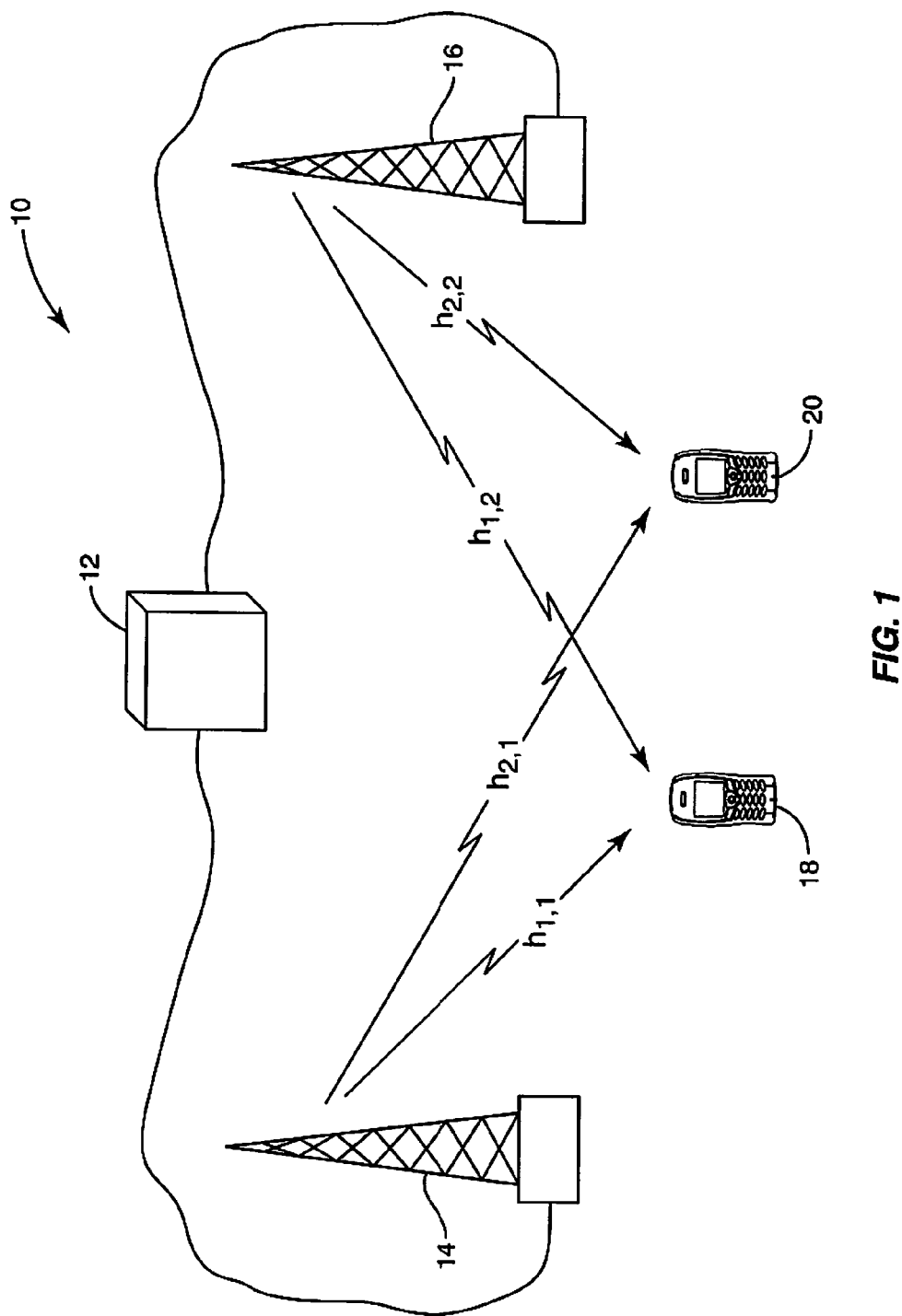
FIG. 1 is a simplified functional block diagram of a MU-COMP downlink with two radioheads and two users.

FIG. 1 depicts a functional block diagram of an exemplary MU-COMP wireless communication network 10. A controller 12 weights signals transmitted by each of at least two geographically distributed transmit antennas 14, 16. Signals from each antenna 14, 16 are received by each of at least two User Equipment (UE) 18, 20 in the operative area, or cell. Because both the transmit antennas 14, 16 and the UEs 18, 20 are geographically dispersed, in general, each UE 18, 20 will not receive signals from each transmit antenna 14, 16 with the same signal strength. Rather, due to path loss, signals transmitted by a closer antenna 14, 16 will be received strongly, and signals transmitted by a further antenna 14, 16 will be received more weakly. Embodiments of the present invention exploit this property of path-loss difference to reduce uplink overhead in general state feedback from the UEs 18, 20 to the network 10.

Consider a MU-COMP downlink with M distributed antennas 14, 16 and N single-antenna UE 18, 20. To facilitate explanation, we assume M=N. The extension to other cases is straightforward. Let x be the transmitted signal vector from the distributed antennas 14, 16. Then the received signal can be expressed as $$y = Hx + n \qquad (2)$$

Without loss of generality, one may assume the diagonal elements of H are stronger (in variance) than the off-diagonal elements. In this case, equation (2) can be expressed further as $$y = \begin{bmatrix} h_{1,1} & & & \\ & h_{2,2} & & \\ & & \ddots & \\ & & & h_{M,M} \end{bmatrix} \tilde{H} x + n \qquad (3)$$

where the diagonal elements of $\tilde{H}$ are 1, and the off-diagonal elements in the i-th row are the ratio of their respective original value to $h_{i,j}$. Then the transmitted vector X can be generated according to the knowledge of $\tilde{H}$. Traditional techniques such as ZF-beamforming or DPC can then be applied. The effect of diag($h_{1,1}, h_{2,2}, \ldots, h_{M,M}$) can be adjusted at the receiver side. Due to channel characteristics of MU-COMP—particularly the path-loss difference described above—the off-diagonal elements of $\tilde{H}$ may be quite small. Therefore only a few feedback bits are necessary to obtain satisfactory knowledge of $\tilde{H}$.

The off-diagonal elements of $\tilde{H}$ are the ratio of two complex Gaussian random variables with different variances. For example, $$\tilde{h}_{1,2} = \frac{h_{1,2}}{h_{1,1}} = \frac{PL_{1,2}}{PL_{1,1}} \frac{a}{b},$$

where $PL_{1,2}$ and $PL_{1,1}$ are large scale fading coefficients. a, b are complex Gaussian random variables with unit variance. $PL_{1,2}$ and $PL_{1,1}$ each represent the square root of respective signal strength. This can be obtained by detecting uplink signals, or transmitted by UEs 18, 20 only rarely. Accordingly, only the quantized measure a/b must be fed back to the network 10 from UEs 18, 20. This variable has a $[0, 2\pi]$ uniform distribution in phase. Its amplitude in log domain $10 \log_{10}$ $$\left(\left|\frac{a}{b}\right|\right)$$

has Probability Density Function (PDF)

$$p(z) = \frac{2 \exp\left(\frac{2z}{4.343}\right)}{4.343 \cdot \left[1 + \exp\left(\frac{2z}{4.343}\right)\right]^2} \qquad (4)$$

a/b can be quantized in phase and in amplitude separately, with $q_1$ and $q_2$ bits each. The quantization of uniform distributed phase with $q_1$ bits is straightforward. The output level can be $$(0:1:2^{q_1} - 1) \times \frac{2\pi}{2^{q_1}}.$$

Figure 2:
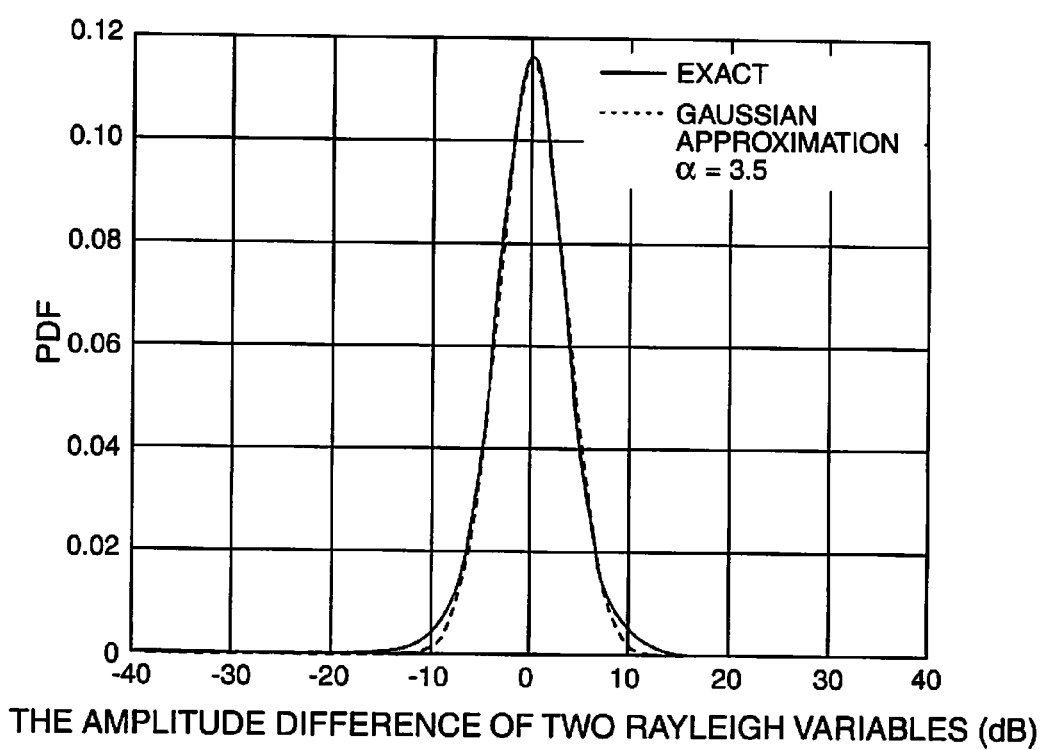
FIG. 2 is a graph plotting actual and approximated values of a Gaussian variable.

The amplitude can be quantized by approximating $10 \log_{10}$ $$\left(\left|\frac{a}{b}\right|\right)$$

as a Gaussian variable with standard deviation of 3.5. FIG. 2 depicts a graph of the actual value and such an approximation. As FIG. 2 indicates, the approximation is quite accurate. An optimal quantization method for Gaussian variables is disclosed by Joel Max, in a paper titled "Quantizing for minimum distortion," published in the IRE Transactions on Information Theory, vol. IT-6, no. 1, pp. 7-12, March 1960, and incorporated herein by reference in its entirety. This method may be used to quantize $10 \log_{10}$ $$\left(\left|\frac{a}{b}\right|\right).$$

Output levels for different quantization bits $q_2$ from 1 to 5 are listed in Table 1. Only the positive output levels are listed; the negative ones are the negative counterpart of the positive values.

TABLE 1

Quantization for Gaussian variables for number of $q_2$ bits

| $q_2$ | Output Level | | | | | | |
|---|---|---|---|---|---|---|---|
| 1 | 2.7930 | | | | | | |
| 2 | 1.5848 | 5.2850 | | | | | |
| 3 | 0.8579 | 2.6460 | 4.7040 | 7.5320 | | | |
| 4 | 0.4494 | 1.3583 | 2.2988 | 3.2984 | 4.3960 | 5.6630 | 7.2415 |
|   | 9.5655 | | | | | | |
| 5 | 0.2306 | 0.6934 | 1.1599 | 1.5638 | 2.1175 | 2.6155 | 3.1315 |
|   | 3.6715 | 4.2420 | 4.8545 | 5.5195 | 6.2580 | 7.1015 | 8.1165 |
|   | 9.4220 | 11.4205 | | | | | |

Other forms of the normalization measure may be used. For example, the log of the ratio of complex Gaussian random variables may be used, where
log(abs(h1))−log(abs(h2)) is the real part, and
arg(h1)−arg(h2) is the imaginary part.

The performance of the MU-COMP network depicted in FIG. 1—with two distributed antennas 14, 16 and two single-antenna UEs 18, 20—was simulated. In the simulation, it was assumed $E(|h_{1,1}|^2) = E(|h_{2,2}|^2) = 1$, $E(|h_{2,1}|^2) = E(|h_{2,1}|^2) = \alpha^2$, where $\alpha \leq 1$ is defined as the cross interference.

Figure 3:
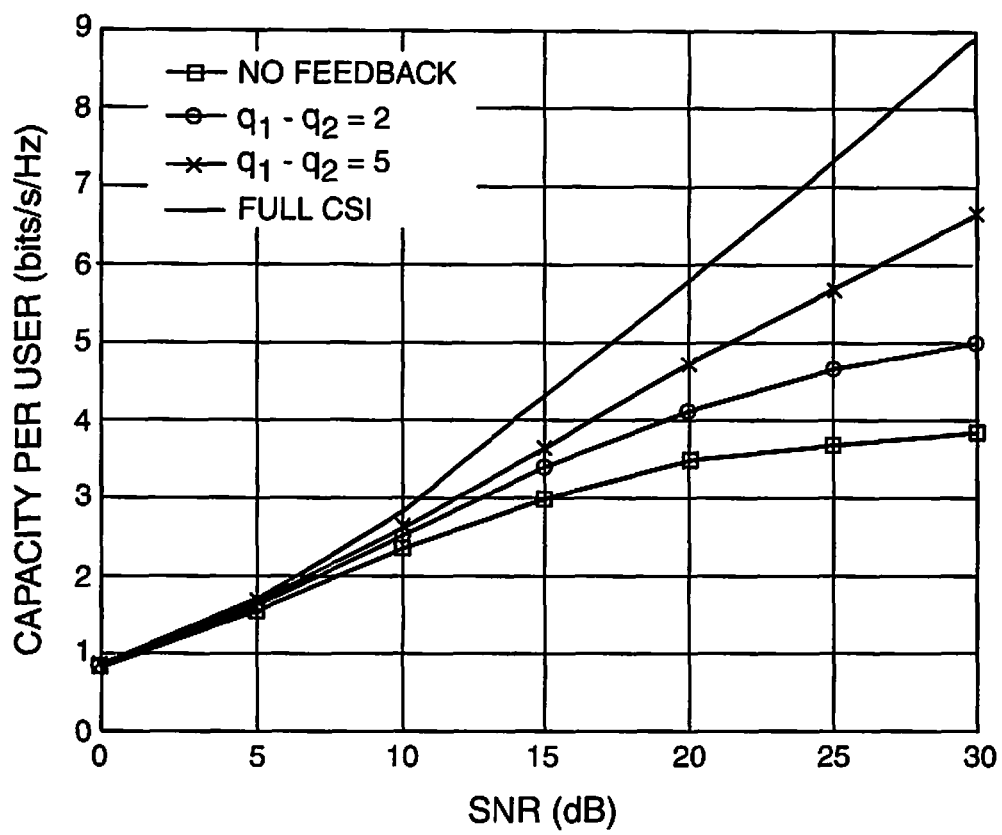
FIG. 3 is a graph plotting capacity v. SNR for various feedback schemes for a MU-COMP with cross interference of 0.2.
Figure 4:
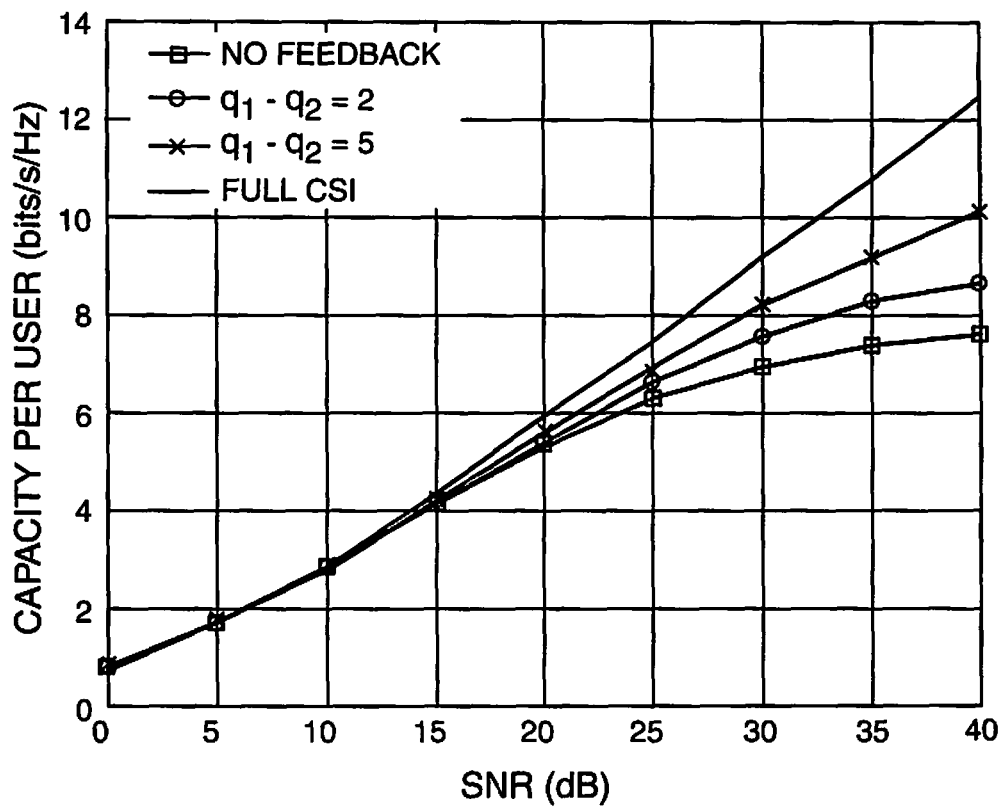
FIG. 4 is a graph plotting capacity v. SNR for various feedback schemes for a MU-COMP with cross interference of 0.05.

FIG. 3 depicts the simulation results for a cross interference of 0.2, and FIG. 4 depicts the results for a cross interference of 0.05. Performances for different feedback schemes are depicted in the graphs. For a full CSI scheme, the channel matrix is assumed to be known at the transmitter side. Assume a 10-bit quantization for each real number is used. The full CSI scheme requires 10*2*4=80 bits to feed back the channel matrix. In contrast, feedback schemes according to embodiments of the present invention only require feedback bits of $(q_1+q_2) \times 2$ for two UE 18, 20. This is significantly less than that required for the full CSI scheme, thus embodiments of the present invention can dramatically reduce uplink overhead for MU-COMP networks.

As FIGS. 3 and 4 depict, network capacity increases as the channel condition feedback increases. While a small performance gap exists between the limited feedback scheme of the present invention and the full CSI scheme, the difference is quite small when the cross interference is small. Since the cross interference can be managed via appropriate user grouping schemes, reducing CSI feedback via the present invention is quite practical and advantageous. Furthermore, the amount of channel condition feedback may change dynamically, as necessary to maintain a required or desired SNR. Additionally or alternatively, the frequency of CSI feedback may be dynamically altered as conditions warrant.

Figure 5:
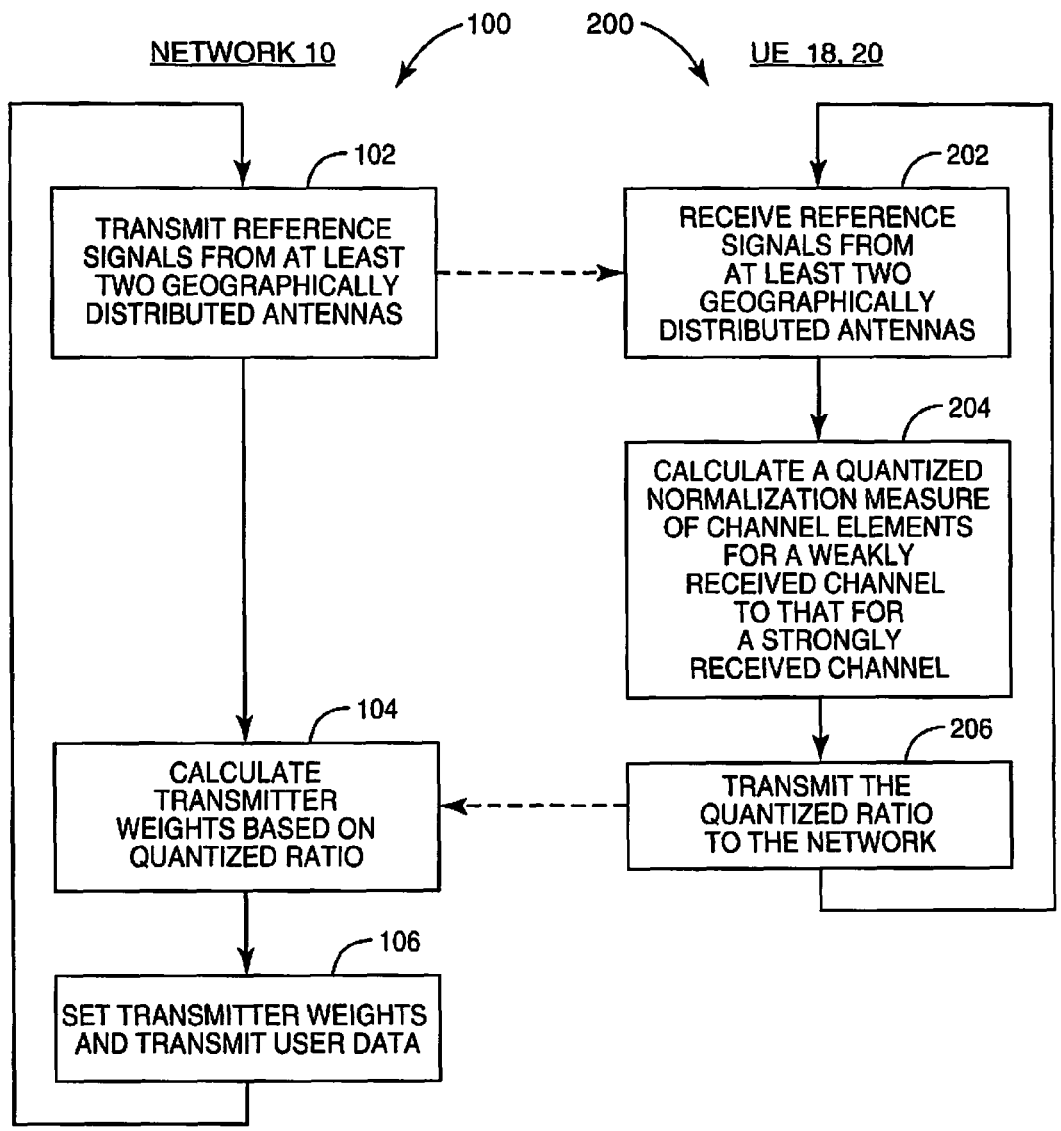
FIG. 5 is a flow diagram of a method of MU-COMP downlink quantization and transmission.

FIG. 5 depicts a method 100 of operating a MU-COMP wireless communication network 10, and a method 200 of operating a UE 18, 20 in a MU-COMP wireless communication network 10. Dashed arrows depict control flow between the two methods 100, 200. While those of skill in the art will recognize that both methods 100, 200 are ongoing continuously, for the purpose of explanation, the method 100 "begins" by transmitting reference symbols—also known as pilot symbols or channel estimation symbols—from at least two geographically distributed transmit antennas 14, 16 (block 102). The method 200 "begins" when a UE 18, 20 receives reference symbols transmitted from at least two geographically distributed antennas (block 202).

The UE 18, 20 calculates a quantized normalization measure, such as the ratio of channel elements for a weakly received channel to that for a strongly received channel (block 204). The UE 18, 20 transmits the quantized normalization measure to the network (block 206), and proceeds to receive more reference symbols (block 202). A controller 12 within the network can calculates complex transmitter weights based on the quantized normalization measures received from two or more UEs 18, 20 (block 104). The controller 12 sets the transmitter weights to the calculated values (block 106), and proceeds to transmit more reference symbols (block 102). In particular, the controller 12 uses the quantized normalization measures from the UEs 18, 20 to create a channel matrix, and uses the channel matrix when sending data on the downlink.

The quantized normalization measure transmitted by the UE 18, 20 at block 206 is represented by significantly fewer bits that the full channel state information (CSI) required by prior art MU-COMP or MU-MIMO systems. This significantly reduces uplink overhead in embodiments of the present invention that implement the methods 100 and 200.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of transmitting signals from a transmitter in a Multi-User Coordinated Multipoint Transmission/Reception wireless communication network comprising at least two geographically distributed transmitters and in which at least two User Equipment (UE) are receiving signals, comprising:
    transmitting reference symbols from each transmitter;
    receiving from each UE a quantized normalization measure of channel elements for a first channel weakly received from a first transmitter and for a second channel strongly received from a second transmitter; and
    determining Coordinated Multipoint Transmission/Reception (COMP) transmit weights in response to the received quantized normalization measure.

2. The method of claim 1 wherein the quantized normalization measure of channel elements is a ratio of only fast fading channel components.

3. The method of claim 1 wherein the quantized normalization measure is represented as the log of a ratio of complex Gaussian random variables having different variances.

4. The method of claim 1 wherein the quantized normalization measure is represented as a ratio of complex Gaussian random variables having different variances.

5. The method of claim 4 wherein the ratio of complex Gaussian random variables having different variances is modeled as a ratio of complex Gaussian random variables having unit variance, scaled by a ratio of signal strengths.

6. The method of claim 5 wherein the ratio of complex Gaussian random variables having unit variance is quantized in phase and amplitude separately.

7. The method of claim 5 wherein the ratio of complex Gaussian random variables having unit variance has a uniform phase distribution over $[0:2\pi]$.

8. The method of claim 5 wherein the amplitude in the log domain of the ratio of complex Gaussian random variables having unit variance is quantized by approximating the amplitude as a Gaussian variable with a standard deviation of 3.5.

9. The method of claim 1 wherein frequency of receiving a quantized normalization measure of the ratio of channel elements varies dynamically.

10. The method of claim 1 wherein determining COMP transmit weights in response to the received quantized normalization measure comprises creating a channel matrix using the received quantized normalization measure, and further comprising using the channel matrix when transmitting data on the downlink.

11. The method of claim 1 wherein the number of UE is equal to or less than the number of transmitters.

12. A method of quantizing and transmitting channel information in a Multi-User Coordinated Multipoint Transmission/Reception (MU-COMP) wireless communication network comprising at least two geographically distributed transmitters by one of a plurality of User Equipment (UE) receiving signals, comprising:
    receiving reference symbols from the at least two transmitters;
    calculating a quantized normalization measure of channel elements for a channel weakly received from a first transmitter and for a channel strongly received from a second transmitter; and
    transmitting the quantized normalization measure to the network.

13. The method of claim 12 wherein the quantized normalization measure of channel elements is a ratio of only fast fading channel components.

14. The method of claim 12 wherein the quantized normalization measure is represented as the log of a ratio of complex Gaussian random variables having different variances.

15. The method of claim 12 wherein the quantized normalization measure is represented as a ratio of complex Gaussian random variables having different variances.

16. The method of claim 15 wherein the ratio of complex Gaussian random variables having different variances is modeled as a ratio of complex Gaussian random variables having unit variance, scaled by a ratio of signal strengths.

17. The method of claim 16 wherein the ratio of complex Gaussian random variables having unit variance is quantized in phase and amplitude separately.

18. The method of claim 16 wherein the ratio of complex Gaussian random variables having unit variance has a uniform phase distribution over [0:2].

19. The method of claim 16 wherein the amplitude in the log domain of the ratio of complex Gaussian random variables having unit variance is quantized by approximating the amplitude as a Gaussian variable with a standard deviation of 3.5.

20. The method of claim 12 wherein frequency of transmitting the quantized ratio to the network varies dynamically.

21. The method of claim 12 wherein the number of UE is equal to or less than the number of transmitters.

22. A Multi-User Coordinated Multipoint Transmission/Reception (MU-COMP) wireless communication network, comprising:
at least two geographically distributed transmitters, each transmitting reference symbols;
a controller operative to weight signals transmitted by the transmitters in response to quantized normalization measures received from each of at least two User Equipment (UE) receiving the reference symbols;
wherein each quantized normalization measure is a quantized normalization measure of channel elements for a channel weakly received from a first transmitter and for a channel strongly received from a second transmitter.

23. The network of claim 22 wherein the quantized normalization measure of channel elements is a ratio of only fast fading channel components.

24. The network of claim 22 wherein the quantized normalization measure is represented as the log of a ratio of complex Gaussian random variables having different variances.

25. The network of claim 22 wherein the quantized normalization measure is represented as a ratio of complex Gaussian random variables having different variances.

26. The network of claim 25 wherein the ratio of complex Gaussian random variables having different variances is modeled as a ratio of complex Gaussian random variables having unit variance, scaled by a ratio of signal strengths.

27. The network of claim 26 wherein the ratio of complex Gaussian random variables having unit variance is quantized in phase and amplitude separately.

28. The network of claim 26 wherein the ratio of complex Gaussian random variables having unit variance has a uniform phase distribution over [0:2$\pi$].

29. The network of claim 26 wherein the amplitude in the log domain of the ratio of complex Gaussian random variables having unit variance is quantized by approximating the amplitude as a Gaussian variable with a standard deviation of 3.5.

30. The network of claim 22 wherein frequency of receiving quantized ratios from each of at least two User Equipment (UE) varies dynamically.

31. The network of claim 22 wherein the controller is operative to weight transfer signals by creating a channel matrix using the received quantized normalization measure, and using the channel matrix when transmitting data on the downlink.

32. The network of claim 22 wherein the number of UE is equal to or less than the number of transmitters.

33. A User Equipment (UE) configured to operate in a Multi-User Coordinated Multipoint Transmission/Reception (MU-COMP) wireless communication network, comprising:
a receiver operative to receive reference symbols transmitted by at least two geographically distributed transmitters;
a controller operative to calculate a quantized normalization measure of channel elements for a channel weakly received from a first transmitter and for a channel strongly received from a second transmitter; and
a transmitter operative to transmit the quantized normalization measure to the network.

34. The UE of claim 33 wherein the quantized normalization measure of channel elements is a ratio of only fast fading channel components.

35. The UE of claim 33 wherein the quantized normalization measure is represented as the log of a ratio of complex Gaussian random variables having different variances.

36. The UE of claim 33 wherein the quantized normalization measure is represented as a ratio of complex Gaussian random variables having different variances.

37. The UE of claim 36 wherein the ratio of complex Gaussian random variables having different variances is modeled as a ratio of complex Gaussian random variables having unit variance, scaled by a ratio of signal strengths.

38. The UE of claim 37 wherein the ratio of complex Gaussian random variables having unit variance is quantized in phase and amplitude separately.

39. The UE of claim 37 wherein the ratio of complex Gaussian random variables having unit variance has a uniform phase distribution over [0:2$\pi$].

40. The UE of claim 37 wherein the amplitude in the log domain of the ratio of complex Gaussian random variables having unit variance is quantized by approximating the amplitude as a Gaussian variable with a standard deviation of 3.5.

41. The UE of claim 33 wherein the transmitter is further operative to dynamically vary the frequency of transmitting the quantized normalization measure to the network.

* * * * *

UNITED STATES PATENT AND TRADEMARK OFFICE
CERTIFICATE OF CORRECTION

PATENT NO. : 8,599,952 B2  Page 1 of 1
APPLICATION NO. : 13/120010
DATED : December 3, 2013
INVENTOR(S) : Larsson et al.

It is certified that error appears in the above-identified patent and that said Letters Patent is hereby corrected as shown below:

On Title Page 2, in Item [56], under "OTHER PUBLICATIONS", in Column 1, Line 13, delete "Aspcts" and insert -- Aspects --, therefor.

In the Specification

Column 4, line 66, delete "$E(|h_{2,1}|^2)= E(|h_{2,1}|^2)=\alpha^2$," and insert -- $E(|h_{1,2}|^2)= E(|h_{2,1}|^2)=\alpha^2$, --, therefor.

In the Claims

Column 7, Line 16, Claim 18, delete "[0:2]." and insert -- [0.2π]. --, therefor.

Signed and Sealed this
Fifteenth Day of July, 2014

Michelle K. Lee
*Deputy Director of the United States Patent and Trademark Office*